United States Patent [19]

Huffman et al.

[11] 4,094,847
[45] June 13, 1978

[54] ELASTOMER MODIFIED MELAMINE RESINS

[75] Inventors: Kenneth Robert Huffman, Stamford; Donald James Casey, Ridgefield; Walter Moreland Thomas, Darien, all of Conn.

[73] Assignee: Formica Corporation, Cincinnati, Ohio

[21] Appl. No.: 767,721

[22] Filed: Feb. 11, 1977

[51] Int. Cl.² ............................................. C08L 61/28
[52] U.S. Cl. ...................... 260/29.4 R; 260/29.2 TN; 260/29.4 UA; 428/425; 428/503; 428/530
[58] Field of Search ...... 260/29.4 UA, 29.4, 29.2 TN; 428/425, 503, 530

[56] References Cited

U.S. PATENT DOCUMENTS

| | | | |
|---|---|---|---|
| 3,479,310 | 11/1969 | Dieterich | 260/29.2 |
| 3,843,580 | 10/1974 | Andersen | 260/29.6 TA |
| 3,925,287 | 12/1975 | Anderson | 260/29.4 UA |

FOREIGN PATENT DOCUMENTS 1,417,421  12/1975  United Kingdom.

*Primary Examiner*—Theodore E. Pertilla
*Attorney, Agent, or Firm*—Frank M. Van Riet

[57] ABSTRACT

A composition of matter comprising a mixture of a melamine/formaldehyde resin and an elastomer comprising either an ethylene/vinyl chloride copolymer containing amide groups or a polyether-based, polyurethane resin containing carboxyl groups, is disclosed.

11 Claims, No Drawings

ELASTOMER MODIFIED MELAMINE RESINS

BACKGROUND OF THE INVENTION

The production of decorative surfaced panels designed for such applications as furniture and vertical surfaces where exceptionally high abrasion resistance is not required has increased enormously over the past decade. These panels comprise a single sheet of melamine/formaldehyde resin impregnated decorative paper which is bonded under heat and pressure to a substrate, usually particleboard, of about one-quarter to about one inch in thickness. These products, because they are produced at low pressures, i.e., about 300 psi, and at very short cure cycles, i.e., 2-3 minutes, are relatively inexpensive and have a good appearance and stain resistance.

Abrasion resistance thereof is, however, often poor and attempts have been made to improve the property by providing a layer of clear, unfilled melamine/formaldehyde resin on top of the decorative sheet. While these panels have proven very successful in that the abrasion resistance is adequately elevated, they deteriorate when subjected to humidity conditions encountered in normal use.

This deterioration manifests itself as surface cracks in the panel after it is subjected to low humidity. The cracks are believed to be a result of the dimensional instability of the melamine/formaldehyde resin. These resins undergo dimensional changes owing (1) to loss of water during curing, (2) to cooling after release from the panel press and (3) to loss or gain of water during subsequent exposure to the environment. The dimensional changes are often enough to strain the resin to failure, thus forming cracks. The decorative cellulosic sheet aids in the resistance of the panel to cracking, but its effectiveness is limited by the need for a resin-rich surface to impart abrasion resistance.

Known additives which generally have been added to melamine/formaldehyde resins (such as sucrose, pentaerythritol sebacate etc.) so as to react with the resin and reduce the tightness of cross-linking usually associated with brittleness do not prevent cracking to a satisfactory degree.

It is therefore clear that there remains a need for a melamine/formaldehyde resin formulation which can be carried as a transparent film on top of a decorative print sheet in decorative panels to thereby confer abrasion resistance thereto, which will not crack when the panel is subjected to low humidity and will still retain the desirable properties of melamine/formaldehyde resins per se, including transparency and resistance to heat and staining.

SUMMARY OF THE INVENTION

We have now discovered a novel melamine/formaldehyde resin formulation which can be impregnated into decorative cellulosic sheets and heat and pressure consolidated into decorative surfaced panels, which resin will not crack at the panel surface upon subjection thereof to low humidity. Furthermore, the panel surface retains its heat resistance, transparency and abrasion resistance.

These results are achieved by the incorporation of an elastomer latex into the melamine/formaldehyde resin in the form of fine particles. Although not wishing to be bound by any specific theory as to why the instant compositions accomplish the result they do, the following discussion is believed particularly pertinent.

It is generally well founded that when a glassy polymer, such as a melamine/formaldehyde resin, is stressed sufficiently either in impact or in tension, crazes and cracks develop. A craze differs from a small crack in that a craze is partially filled with a network of polymer molecules pulled from the walls and serving as a potential healing mechanism. Crazes are usually initiated by high local stress concentrations in the vicinity of flaws or crack tips. Rate of craze growth depends on the fracture energy of the resin, the applied forces and the temperature. If liquids are present, they may diffuse to the craze front, plasticize the area and assist in craze growth. Ultimately, fracture results from the breaking of the crazed material.

Elastomeric particles, on the other hand, can prevent failure by either or both of two general mechanisms. By the first mechanism, the distorted stress field around each particle initiates microcrazes. These microcrazes multiply and grow, but large amounts of energy are absorbed and a stabilized network soon forms. The system thus supports a higher elongation than in the absence of particles and returns, on release of stress, to its original state. By the second mechanism, which may operate independently, the stress field causes shear bands to develop from the particles into the matrix. Shear banding is a form of yielding and orientation usually accompanied by strain hardening. Thus a stabilized network forms in this case as well.

It thus appears probable that the elastomers incorporated into the melamine/formaldehyde resin to produce the instant compositions, function as described above to reduce craze and cracks when the resin-elastomer composition is impregnated into cellulosic sheets which are then consolidated into decorative panels and utilized at low humidity.

Mixtures of melamine/formaldehyde resins and rubbery polymers have been known in the art, see British Provisional Specification No. 16737/72, dated Apr. 11, 1972, but said specification does not disclose the elastomer components set forth as useful herein.

DESCRIPTION OF THE INVENTION INCLUDING PREFERRED EMBODIMENTS

As mentioned briefly above, we have now discovered a novel composition of matter comprising a mixture of
(1) a melamine/formaldehyde resin syrup and
(2) an elastomer comprising
   (a) an ethylene/vinyl chloride copolymer containing amide groups or
   (b) a polyether based, polyurethane resin containing carboxyl groups.

The melamine/formaldehyde resin syrups useful herein are well known to those skilled in the art. They are generally prepared by adding water, melamine crystal, formaldehyde, usually used as a 37% solution in water, and other additives in minor amounts, to water in mole ratio of melamine to formaldehyde of from about 1:1.6 to about 1:2.5 and allowing the reaction to proceed at about 75°–90° C. for 5–12 hours. Sufficient material is added to produce a resin solids content of from about 40% to about 75%, preferably from about 50% to about 65%, in the resultant aqueous solution.

The elastomer component of our novel compositions is added to the melamine/formaldehyde resin in such a quantity so as to result in a solids content of the elastomer of from about 2.5% to about 30.0%, preferably from about 5.0% to about 25.0%, by weight, based on the total weight of the melamine/formaldehyde resin solids.

The elastomer is preferably added to the melamine/formaldehyde resin solution as small particles and usually in latex form. The particle size in most instances should not exceed about 4,000 A; however, it is possible, in some cases, to utilize elastomers having a particle size, on the average, of up to about 20,000 A. Where it is required that the compositions of this invention produce a transparent system, e.g., in the production of decorative panels of a specific color or having a specific decorative pattern or design on the decorative layer, it is preferred that the elastomeric additive have a particle size of less than about 1,000 Angstroms. Alternatively, haziness can be reduced, i.e., transparency can be achieved by matching the refractive index of the elastomer to that of the melamine/formaldehyde resin. The combination of a particle size less than about 1,000 Angstroms and a matching refractive index will, of course, further enhance the usefulness of the elastomer.

Examples of elastomeric materials which have been found to be effective in producing our novel compositions include the ethylene/vinyl chloride polymers having available reactive amide groups. These copolymers are well known in the art and contain from about 20% to about 30% ethylene, from about 65% to about 80% vinyl chloride and from about 0.5% to about 7%, preferably from about 1.0% to about 5.0% amide groups, said percentages totaling 100% and being, by weight, based on the total weight of the elastomer. The amide functionality can be imparted to the ethylene/vinyl chloride copolymer in any manner known to those skilled in the art such as by copolymerization thereof with amide containing vinyl monomers e.g. acrylamide, methacrylamide and the like, see U.S. Pat. No. 3,428,582 incorporated herein by reference.

The useful polyurethane elastomers are governed only by their ability to either dissolve in water or to form a latex. That is to say, if the polyurethane elastomer is per se water-soluble, it can be added as such to the aqueous melamine/formaldehyde resin solution and produce a composition which may be used to prepare a useful laminate. Alternatively, if the polyurethane elastomer is capable of being formed into a latex, the latex can be added to the aqueous melamine/formaldehyde resin solution and the elastomer will, of course, remain dispersed therein. The resultant dispersion can then be used to impregnate a decorative sheet and form a decorative panel.

The polyurethane resin can therefore be produced by reacting such polyols as those having a molecular weight of from about 400 to about 5,000, preferably from about 600 to about 3,000, with an isocyanate. Useful polyols include those produced from diols such as the polyoxyalkylene adducts of diols and alkylene oxides such as ethylene oxide, propylene oxide, butylene oxide, mixtures thereof and the like. Useful diols include ethylene glycol, 1,2-propylene glycol, 1,3-propylene glycol, 1,2-butanediol, 1,4-butanediol, 1,6-hexanediol, hydroquinone, bisphenol A and the like.

Typical polyoxyalkylene diols include polyethyleneether glycol, polypropyleneether glycol, polytetramethyleneether glycol and the like.

Polyoxyalkylene arylene diols which also have molecular weights ranging from about 400 to about 5,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters constitute another class of reactive organic diols which may be employed in preparing urethane prepolymers used in the present invention. While the preparation of polyesters suitable for this purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic succinic, glutaric, adipic, pimelic, suberic, azelaic, terephthalic, sebacic, malic, phthalic, cylohexanedicarboxylic and endomethylenetetrahydrophthalic acid, and the like, and their isomers, homologs, and other substituted derivatives, e.g., chloro derivatives. The linear polyesters used in preparing the urethane prepolymers also have molecular weights ranging from about 400 to about 5,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 20 to about 300. When preparing these polyesters, an excess of diol over dicarboxylic acid is generally used.

As can be readily appreciated, mixtures of the various reactive organic diols described hereinabove may also be employed in preparing the urethane prepolymers of the present invention.

The organic diisocyanates which can be employed to produce the urethane used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(cyclohexyl isocyanate), 4-chloro-m-phenylene diisocyanate, isophorone diisocyanate, o,p, or m-phenylene diisocyanate, trimethylhexamethylene diisocyanate, 4-t-butyl-m-phenylene diisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The polyol may be reacted with the diisocyanate in the presence of a suitable catalyst such as an organotin compound, e.g., dibutyltin dilaurate, dibutyltin octoate and the like; a tertiary amine, e.g., triethylene diamine; an organolead compound, e.g., lead octoate and the like, at concentrations of from about 0.001 to about 0.1%, by weight, based on the total weight of the polyol and diisocyanate. The reaction is allowed to proceed at a temperature of from about 60° to about 180° C. until the isocyanate terminated urethane prepolymer forms, i.e., from about 4 to about 24 hours.

As mentioned above, in order for the polyurethane elastomer to be useful herein, it must contain carboxyl groups. These carboxyl groups, present in the elastomer in a concentration of about 3.0% to 10.0%, by weight, based on the total weight of the elastomer, are incorporated into the elastomer by replacing an equivalent amount of the above mentioned polyol with a polyol containing at least one carboxyl group. Suitable compounds conforming to this description are 2,2-dimethylol propionic and, tartaric acid, glyceric acid, bis(hydroxymethyl)benzoic acid, bis(hydroxymethyl)cyclohexane carboxylic acid and the like. U.S. Pat. No. 3,479,310, also incorporated herein by reference, teaches the production of such carboxyl containing polyurethanes.

The novel compositions of the instant invention are then prepared by blending the elastomer per se or after having emulsified it with a suitable amine such as triethanol amine, N-methyl morpholine, tetramethyl ammonium hydroxide, triethylamine, tetrabutylammonium hydroxide, and the like, with the aqueous melamine/formaldehyde resin solution, with stirring for from about 3-15 minutes. Catalyst, such as ammonium sulfate, thiourea, hydrochloric acid, sulfuric acid, formic acid, acetic acid, oxalic acid, sodium hydroxide, potassium hydroxide, sodium carbonate and the like, can be added at this time to regulate subsequent cure rate of the melamine/formaldehyde resin when the decorative sheet containing it is heat and pressure consolidated into the decorative panel. The use of a strong acid catalyst when a basic emulsifier is used to produce the elastomer latex should be avoided.

The aqueous melamine/formaldehyde resin solution can be used as such or the resin itself and/or the solution. Often times called a "syrup", may be further modified by the addition of known additives thereto.

The blending of the prepared elastomer with the melamine/formaldehyde resin solution is the preferred manner in which the novel compositions of our invention may be prepared. It is also possible, however, to form the elastomer in situ in the melamine/formaldehyde solution by incorporating therein a solution of the elastomer components and then forming the elastomer during the melamine/formaldehyde precuring operation and/or the decorative panel production.

The resultant composition is then used to impregnate a cellulosic decorative sheet in a manner known in the art. The composition, once impregnated, is then precured by heating at 80°-125° C. for 3-50 minutes, shorter times requiring higher temperatures and vice versa. The impregnated paper should contain at least about 40% resin, by weight, based on the total weight of the resin-impregnated sheet.

A decorative panel is then prepared from the B-staged decorative sheet by forming a stack in superimposed relationship of a steel plate, a ¼ inch-1 inch particleboard sheet, the B-staged decorative sheet, a release sheet and a second steel plate. The stack is placed in a press, heated to at least about a 130° C. platen temperature and at least 200 psi pressure, for about 15 seconds to about 12 minutes. The resultant panel is recovered by merely opening the press and removing the release sheet.

The following examples are set forth for purposes of illustration only and are not to be construed as limitations on the present invention except as set forth in the appended claims. All parts and percentages are by weight unless otherwise specified.

The Taber abrasion Resistance Test mentioned below is specifically detailed in N.E.M.A. Standards Publication "Laminated Thermosetting Decorative Sheets", Standard #LD12,01 "Method of Test of Resistance of Surface to Wear".

EXAMPLE A

Preparation of a Polyurethane Emulsion

To a suitable reaction vessel equipped with stirrer, thermometer, $N_2$ gas inlet and vacuum adapter are added 44.2 parts of polytetramethylene glycol having a molecular weight of 2,000 and 11.9 parts of 2,2-bis(hydroxymethyl)propionic acid. The vessel is heated to 100° C. and a 1-2 mm Hg pressure for 2 hours to dry the glycol and acid. A blanket of nitrogen gas is then maintained over the vessel contents and the vessel is cooled to 40° C. 43.9 Parts of toluene diisocyanate are then added and the exotherm is controlled at 80° C. for 8 hours. The vessel is then cooled to 60° C. and the resultant polyurethane polymer is transferred to a second vessel and sealed under nitrogen.

To a third vessel are added 7.0 parts of triethanol amine, as an emulsifier, in 90 parts of water. The vessel is cooled to 4° C. The cooled solution is transferred to a fourth vessel which has been cooled to 0° C. and is equipped with vigorous agitation means. The solution is vigorously agitated and 30.0 parts of the above-prepared polyurethane polymer is heated to 100° C. and added to the vortex of the agitating solution in a continuous stream. When addition is complete, 10.0 parts of chipped ice are added and stirring is continued 1 minute. Another 10.0 parts of chipped ice is added and the media is again agitated for 1 minute. The vessel contents are then transferred to a suitable container, cooled to <10° C. and stirred for 5 hours while the temperature slowly rises to ambient. A clear, blue opalescent emulsion of 25% solids is recovered. Small amounts of coagulum which may be present therein are removed by filtering the emulsion through No. 1 Whatman paper. The average particle size of the elastomer is less than 1,000 Angstroms.

EXAMPLE 1

100 Parts of a commercially available 1 : 1.8 melamine/formaldehyde syrup (58% solids) are added to a suitable reaction vessel. The liquid is stirred and 0.05 part of ammonium sulfate catalyst is added thereto. To the resultant mixture are then added 34.8 parts of the polyurethane emulsion of Example A. Stirring is continued for 5 minutes. A stable emulsion is recovered.

A large section of woodgrained print paper is impregnated with the resultant stable emulsion. The impregnated sheet is precured in an air circulating oven. The precured paper sheet is then placed atop a particleboard section of the same size with the decorative side up and a release sheet is placed on top of the decorative side thereof. The assembly is placed between 2 steel press plates, slid into a hydraulic press heated to a platen temperature of about 155° C. and pressed at 250-350 psi for 2-3 minutes. The resulting surface layer of polyurethane modified resin is transparent and about 45µ thick. The panel is removed from the press and tested.

The low humidity cracking resistance thereof is determined by placing the decorative panel into an indicating CaSO₄ conditioned desiccator at 0% R.H. and counting cracks formed at intervals during 30 days through a stereomicroscope.

Abrasion resistance is determined as set forth above. The Taber cycles to 50% print erasure are 250. No cracks appear after 30 days.

EXAMPLES 2–16

Following the procedure of Example 1, additional decorative panels are prepared. The thickness of the resin layers is varied as is the percentage of the polyurethane. The results are set forth in Table I, below.

TABLE I

| Example | % Polyurethane | Surface Resin Thickness μ | Taber Cycles to 50% Print Erasure | No. Cracks after 30 days at 0% R.H. |
|---|---|---|---|---|
| 2 | 21 | 35 | 370 | 0 |
| 3 | 5 | 25 | 300 | 0 |
| 4 | 10 | 45 | 350 | 0 |
| 5 | 10 | 20 | 200 | 0 |
| 6 | 10.8 | 25 | 200 | 0 |
| 7 | 10.8 | 15 | 170 | 0 |
| 8 | 8.9 | 20 | 230 | 0 |
| 9 | 10.8 | 45 | 330 | 0 |
| 10 | 7.5 | 45 | 310 | 0 |
| 11(comp) | 0 | 0 | 70 | 0 |
| 12(comp) | 0 | 8 | 80 | 20 |
| 13(comp) | 0 | 30 | 350 | 50 |
| 14(comp) | 0 | 45 | 310 | > 50 |
| 15(comp) | 0 | 35 | 350 | > 50 |
| 16(comp) | 0 | 40 | 360 | > 50 |

EXAMPLE 17

Again following the procedure of Example 1 except that 10% of a commercially available ethylene/vinyl chloride (18/77) copolymer containing 5% amide functionality is used instead of the polyurethane, a smooth, clear film results on the decorative panel. The average particle size of the copolymer is about 775 A. Precuring followed by laminating as described in Example 1 results in panels having a Taber value of 140–170. No cracks are observed after 40 days at 0% R.H. The decorative pattern is readily observable.

EXAMPLE 18

The procedure of Example 1 is again followed except that a commercially available poly(ethylene adipate) of 1700 molecular weight and having terminal hydroxyl groups is used as the polyol. Similar results are achieved, the polyurethane elastomer having been added to the melamine/formaldehyde resin solution by suspending it in the aqueous phase thereof. Particle size of the urethane is about 1,000 Angstroms.

EXAMPLE 19

A bisphenol A-ethylene oxide adduct of 2,800 molecular weight is used as the polyol in place of that of Example 1. Again an excellent decorative panel with no cracks after 35 days at 0% R.H. is produced. The particle size of the polyurethane is about 1,500 Angstroms.

EXAMPLE 20

The procedure of Example 1 is again followed except that the particle size of the elastomer in the emulsion is about 3,800 Angstroms and a white decorative sheet is used. A panel having excellent crack resistance at 0% R.H. and a somewhat cloudy surface is produced.

We claim:
1. A composition of matter comprising a mixture of
   1. an aqueous melamine/formaldehyde resin solution and,
   2. from about 2.5% to about 30.0%, by weight, based on the weight of the resin solids of (1), of an elastomer comprising
      a. an ethylene/vinyl chloride copolymer containing from about 0.5% to about 7.0%, by weight, based on the total weight of (a), of amide groups or
      b. a polyurethane resin containing from about 3.0% to about 10.0%, by weight, based on the total weight of (b), of carboxyl groups,
   said elastomer having a particle size of up to about 20,000 Angstroms.
2. A composition of matter according to claim 1 wherein the percentage of said (2) ranges from about 5.0% to about 25.0%, by weight, same basis.
3. A composition of matter according to claim 1 wherein said elastomer has a particle size of up to about 4,000 Angstroms.
4. A composition of matter according to claim 1 wherein said elastomer has a particle size of up to about 1,000 Angstroms.
5. A composition of matter according to claim 1 wherein said elastomer is (a).
6. A composition of matter according to claim 1 wherein said elastomer is (b).
7. A composition of matter according to claim 1 wherein said (a) contains from about 1.0% to about 5.0%, by weight, same basis, of amide groups.
8. A composition of matter according to claim 5 wherein said elastomer contains from about 1.0% to about 5.0%, by weight, same basis, of amide groups, has a particle size of up to about 1,000 Angstroms and is present in a range of from about 5.0% to about 25.0%, by weight, same basis.
9. A composition of matter according to claim 6 wherein said elastomer has a particle size of up to about 1,000 Angstroms and is present in a range of from about 5.0% to about 25.0%, by weight, same basis.
10. A composition of matter according to claim 1 in the form of an emulsion.
11. A method for the production of the composition of claim 1 which comprises
    I. forming an aqueous solution of a melamine/formaldehyde resin,
    II. forming an aqueous emulsion of
       A. an ethylene/vinyl chloride copolymer containing from about 0.5% to about 7.0%, by weight, based on the total weight of (A), of amide groups or
       B. a polyurethane resin containing from about 3.0% to about 10.0%, by weight, based on the total weight of (B), of carboxyl groups,
    III. blending said (I) with from about 2.5% to about 30.0%, by weight, based on the weight of the resin solids of (I), of said (II) with stirring and
    IV. recovering the resultant emulsion.

* * * * *